Nov. 13, 1962  J. H. CHILDS ETAL  3,063,291
HIGH-VACUUM CONDENSER TANK FOR ION ROCKET TESTS
Filed Sept. 24, 1959
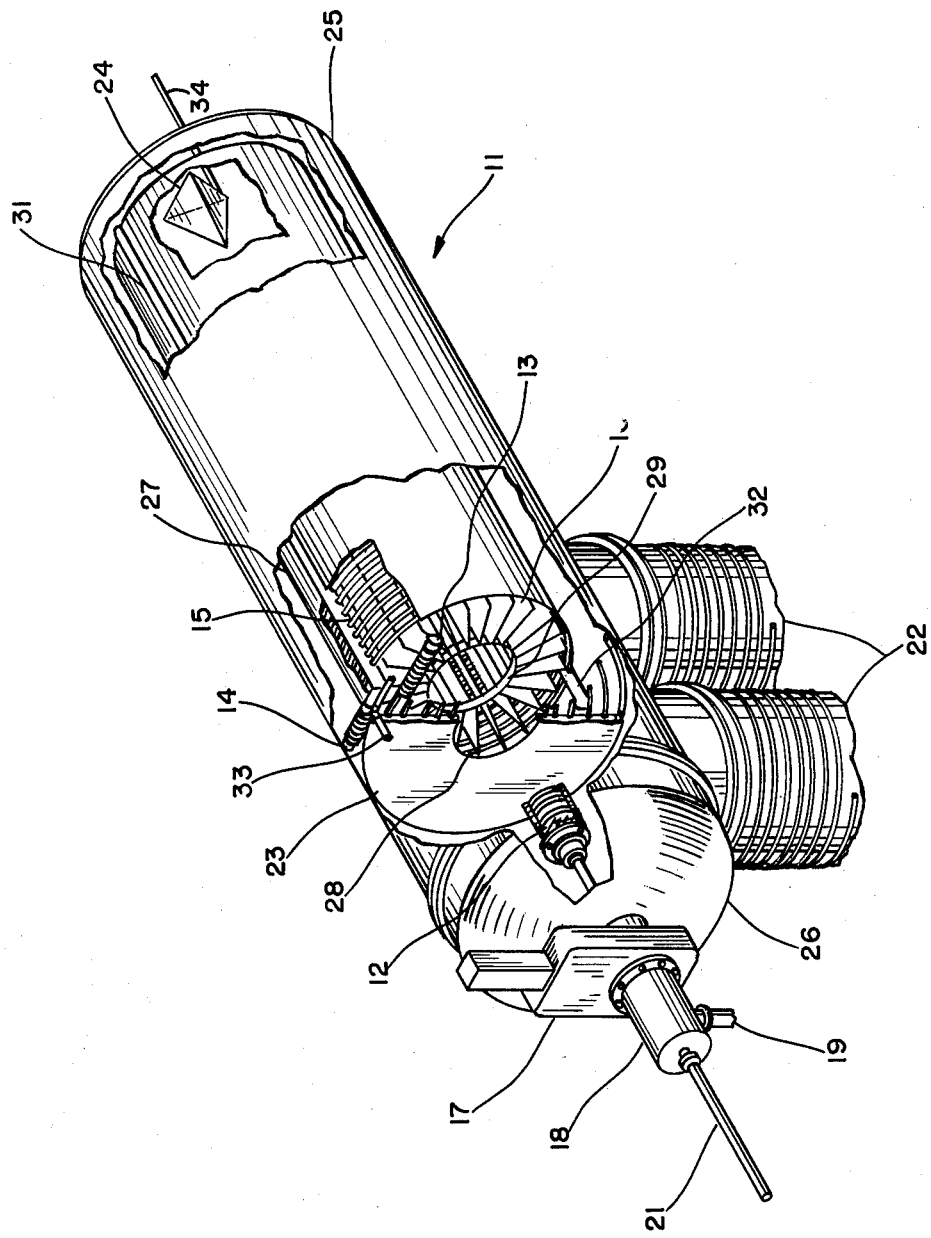
INVENTORS
J. HOWARD CHILDS
WILLIAM R. MICKELSEN
BY
ATTORNEY

3,063,291
HIGH-VACUUM CONDENSER TANK FOR ION ROCKET TESTS
James Howard Childs, Olmsted Falls, and William R. Mickelsen, North Olmsted, Ohio, assignors to the United States of America as represented by the Administrator of National Aeronautics and Space Administration
Filed Sept. 24, 1959, Ser. No. 842,170
4 Claims. (Cl. 73—116)
(Granted under Title 35, U.S. Code (1952), sec. 266)

The invention described herein may be manufactured and used by or for the Government of the United States of America for governmental purposes without the payment of any royalities thereon or therefor The present invention relates to an ion rocket test facility, and more particularly, to a vacuum tank for testing ion rockets at pressures of $10^{-7}$ millimeters of mercury and below.

In the testing of small scale ion rockets, large vacuum tanks are required with ample space for installing the necessary instrumentation to study beam spreading rates and exit space charge effects. Tank pressures below $10^{-7}$ mm. of mercury are desired to minimize gas focusing of the ion beam. It the tank pressures are much above $10^{-7}$ mm. of mercury, collisions between the high velocity ions and neutral molecules will result in considerable secondary ions and electrons. As the beam is positively charged, the low energy secondary ions will be forced away from the beam, whereas the secondary electrons will be drawn into the beam to help in neutralizing it. The secondary electrons thus affect the external space charge and this, in turn, can affect internal engine performance. Low tank pressures are therefore deemed essential for any realistic experimental evaluation of engine performance. Initial evacuation of the tank to the required pressure can be accomplished by oil diffusion pumps or other suitable vacuum pumps; however, an excess number of such pumps—move than fifty 32-inch oil diffusion pumps—would be required to maintain the required pressure during ion rocket operation.

An object of this invention is the provision of a compact low-cost facility for the testing of ion rockets.

Another object of the instant invention is the provision of an ion rocket test facility wherein pressures of the order of $10^{-7}$ mm. of mercury can be maintained with a minimum number of oil diffusion pumps to maintain the required pressure.

An additional object of the invention in an ion rocket test facility wherein cooled condenser baffles are employed to freeze the ion rocket exhaust and thereby obviate the need for pumping it.

Other objects and many attendant advantages of the present invention will be apparent in the following detailing description when taken together with the accompanying lines in which the figure is a partially sectional pictorial view of the ion rocket test facility.

The test facility 11 comprises a cylindrical tank 25 which has one hinged (not shown) end 26 to facilitate an easy accessibility to the inside. The tank is kept under vacuum conditions by means of two suitable vacuum pumps 22 which are preferably oil diffusion pumps. On the outside of the tank 25 are mounted an ion rocket engine housing 18 and a conventional high vacuum-type valve 17. The ion rocket 12 is attached to a push rod 21 which extends through the valve 17 and rocket engine housing 18 to facilitate the removal of the ion rocket 12 from the inside of the tank to the engine housing 18. By means of the valve 17 and housing 18, the test rocket 12 may be easily removed from the inside of the test tank chamber 25, either to be worked on or modified in the course of experimentation without having to lose the vaccum that has been developed inside the tank 25. The housing 18 may be kept under a vacuum by means of the lead 19 which goes to one of the vacuum pumps 22.

When the rocket 12 being tested, high velocity ions and plasma are emitted and travel the length of the tank 25 and strike a target 24 at the opposite end. The target 24 serves to scatter the ions and plasma so that they rebound among the cooled baffles 16. The cooled baffles 16 extend radially outward from an inner ring 29 and are cooled by a series of coils 15. The coolant enters an inlet pipe 13 and traverses the length of the baffles 16 through a header 32. The cooling coils 15 intersect the header 32 and carry the coolant around the coil 15 to an outlet header 31, the coolant leaving the facility 11 through an outlet 14. The entire baffle and cooling coil arrangement is enclosed by a casing 27. The cooled baffles extend to a point adjacent a cooled bulkhead 23 to adjacent the target end of the tank. The cooled bulkhead 23 is the same diameter as the inside of the tank 25 and has an opening in the center 28 corresponding to the size of the inner ring 29 upon which the blades 16 are mounted. A lead pipe 33 serves to direct the coolant to the bulkhead 23.

Target 24 is preferably wedge-shaped and is usually composed of a series of water-cooled pipes (not shown); the coolant entering from the rear of the tank 25 through an inlet 34. The baffles are preferably cooled using liquid nitrogen as the coolant therefor.

Obviously, many modifications and variations of the present invention are possible in the light of the above teachings. It is, therefore, to be understood that within the scope of the appended claims the invention may be practiced, otherwise it is specifically described.

1. Apparatus for testing an ion rocket engine having ions and plasma in the exhaust thereof, said apparatus comprising in combination: a tank having means for securing an ion rocket to one end therof, means for providing a vacuum for said tank, a plurality of cooled baffles disposed in said tank, said baffles being arranged so as to provide an unobstructed area from one end of said tank to the other end, a target mounted within said tank adjacent to one end thereof, and a surface on said target being angularly disposed to the ion engine exhaust to scatter the ions and plasma into said baffles.

2. An ion rocket test facility comprising in combination: a tank having means for securing an ion rocket adjacent to one end of said tank, means for providing a vacuum for said tank, a plurality of cooled baffles longitudinally disposed in said tank, said baffles being arranged so as to provide an unobstructed area from one end of said tank to the other end, a cooled target mounted adjacent to the other end of said tank, said target being constructed so that the surface thereof reflects the ion engine exhaust into said cooled baffles.

3. Apparatus for testing an ion rocket engine having ions and plasma in the exhaust thereof, said apparatus comprising in combination: a tank having means for securing an ion rocket engine adjacent one end of said tank, means for providing a vacuum for said tank, a ring member situated concentrically within said tank, a plurality of cooled baffles longitudinally disposed in spatial relationship within said tank, said baffles radially extending from said ring member, a cooled target mounted adjacent to the other end of said tank, and a surface on said target being angularly disposed to the ion rocket engine exhaust to scatter the ions and plasma into said baffles.

4. Apparatus for testing an ion rocket engine having ions and plasma in the exhaust thereof, said apparatus comprising in combination: a tank having means for containing an ion rocket engine adjacent to one end of said tank, means for providing a vacuum for said tank, an ion rocket engine housing mounted externally on said end of said tank, a high vacuum valve mounted externally between said housing and said end of said tank whereby said ion rocket can be removed from said tank to said housing while maintaining vacuum conditions in said tank, a ring member situated within said tank, a plurality of cryogenically cooled baffles disposed in spatial relationship within said tank, said baffles radially extending from said ring member, a water cooled target mounted adjacent to the other end of said tank, and a surface on said target being angularly disposed to the ion rocket engine exhaust to scatter the ions and plasma into said baffles.

References Cited in the file of this patent

UNITED STATES PATENTS

| | | |
|---|---|---|
| 2,615,331 | Lundgren | Oct. 28, 1952 |
| 2,826,708 | Foster | Mar. 11, 158 |
| 2,883,568 | Beam et al. | Apr. 21, 1959 |
| 2,939,316 | Beecher et al. | June 7, 1960 |